United States Patent [19]

Seabold et al.

[11] 4,315,047

[45] Feb. 9, 1982

[54] CURLED TAPE, ROLL, AND CONTAINER END

[75] Inventors: Thomas W. Seabold, St. Paul; Richard A. Patterson, Woodbury; Richard P. de Neui, Lake Elmo, all of Minn.

[73] Assignee: Minnesota Mining and Manufacturing Company, St. Paul, Minn.

[21] Appl. No.: 188,671

[22] Filed: Sep. 19, 1980

Related U.S. Application Data

[63] Continuation-in-part of Ser. No. 121,661, Feb. 15, 1980, abandoned.

[51] Int. Cl.³ .............................................. B32B 3/02
[52] U.S. Cl. .................................... 428/64; 428/138; 428/167; 428/344; 428/356; 428/906
[58] Field of Search ................................... 428/40–42, 428/343–356, 64, 138, 167, 906; 427/207.1, 208.8

[56] References Cited

U.S. PATENT DOCUMENTS 2,769,633  11/1956  Krueger .......................... 271/2.4
2,896,246   7/1959  Brady ............................. 428/352
3,502,207   3/1970  Alexander ..................... 427/208.6
4,113,906   9/1978  Brandwein ..................... 428/42

Primary Examiner—Bernard D. Pianalto
Attorney, Agent, or Firm—Cruzan Alexander; Donald M. Sell; William L. Huebsch

[57] ABSTRACT

Adhesive tapes which exhibit curl as the result of deformation of the backings of the tapes are described. The tapes may exhibit various curls including transverse and longitudinal curls and are particularly suitable for sealing preformed openings in container ends without concomitant entrapment of air between a given tape segment and the container end.

12 Claims, 6 Drawing Figures

CURLED TAPE, ROLL, AND CONTAINER END

CROSS-REFERENCE TO RELATED APPLICATION

This application is a continuation-in-part of our copending application Ser. No. 121,661, filed Feb. 15, 1980, now abandoned.

BACKGROUND OF THE INVENTION

This invention relates to curled adhesive tapes.

One difficulty often encountered in applying a flat length of tape to flat objects is that air can be entrapped between the tape and the flat, smooth surface to which it is applied. Air entrapment is often undesirable since it can ultimately result in a non-uniform bond between the tape and the surface.

Entrapment of air as described above occasionally occurs when applying a length of flat tape comprising a particularly aggressive, pressure-sensitive adhesive layer and is even more likely to occur in the event that the aggressive adhesive layer has an exposed surface which is free of surface irregularities and is glassy in nature. More particularly a length of flat tape comprising an aggressive, pressure-sensitive adhesive layer will tend to adhere almost instantaneously over its entire length to a flat surface to which it is being applied once the tape is brought into contact with that surface. The consequence of this instantaneous adherence can be the undesirable entrapment of air. In the event that the exposed surface of the adhesive layer is glassy, and once air has been entrapped, the air cannot escape even upon application of an external flattening force. This is in contrast to the situation in which surface irregularities exhibited by adhesive layers comprising tapes of other constructions (e.g. linered tapes) can permit entrapped air to escape, particularly upon the application of a flattening force.

One commercial situation in which employment of flat pressure-sensitive tape may lead to an unsatisfactory product unless used on a liner is in the sealing of preformed openings in container ends with predetermined lengths of tape. Here it is highly desirable that no air be entrapped between the tape and the container end since, particularly upon exposure to elevated temperatures, entrapped air can lead to localized detachment of the tape and can ultimately result in contamination of the container's contents through exposure to the external environment or in corrosion of the top of the container end.

Conventional tape applying machines, such as those described in U.S. Pat. Nos. 2,684,240 (Lindsey), 2,990,081 (deNeui), 3,472,724 (Casey), 3,750,511 (Toensing) and copending application Ser. No. 41,629 filed May 23, 1979 and commonly assigned, typically require the use of linered tape when tape is applied to container ends. Linered tapes comprise tapes having a slightly irregular or rough surface on an aggressive, pressure-sensitive adhesive layer which is covered with a release liner. The adhesive layer can be applied with these machines to container ends without significant entrapment of air. Linerless tapes which typically comprise glassy, aggressive pressure-sensitive adhesive layers and which are more economical than linered tapes are not generally compatible with applicating machines of the above type since air entrapment between the adhesive layer and the container end will likely occur.

SUMMARY OF THE PRESENT INVENTION

The present invention provides tapes exhibiting curl as the result of deformation of the backing. A preferred tape exhibits curl as the result of uniformly spaced localized areas in which the tape backing has been deformed. These curled tapes can be readily applied to flat surfaces without entrapment of air even though the tape has a glassy, aggressive pressure-sensitive adhesive layer. In particular, a curled tape of the present invention can be applied to a surface by first securing only a portion of the tape to that surface. Then a flattening force may be applied to the tape, initially in the area in which the curled tape has already been secured to the surface and then successively towards the unsecured edges of the curled tape. By applying a curled tape to a surface in this manner, air is excluded from between the tape and the surface as the tape is flattened onto the surface.

The tapes of the present invention may exhibit a broad range of curl so as to provide a tape having a suitable curl for a particular end-use and are produced using the tape curling devices described in copending application Ser. No. 188,672, filed of even date and commonly assigned, incorporated herein by reference.

The curled tapes of the present invention are particularly suitable for sealing preformed openings in container ends, without the undesired entrapment of air between the tape and a container end. When tape applying machines, such as those described in U.S. Pat. Nos. 2,990,081 (deNeui), 3,750,511 (Toensing), and said copending application Ser. No. 41,629, are employed, it is preferred that the vacuum wheels used in those machines be of the type described in copending application Ser. No. 121,715, filed Feb. 15, 1980 and commonly assigned, incorporated herein by reference. Those vacuum wheels are designed so as to secure only a portion of a tape segment to the container end such that most of the tape segment, as the result of the tape's curl, remains unsecured to the container end. Subsequent to initial application of the tape segment to a container end by means of such a vacuum wheel, the tape segment will then be flattened onto the container end in a manner which assures substantial exclusion of air.

The curled tapes of the present invention may also be applied to objects using the tape applying machines described in U.S. Pat. Nos. 2,684,240 (Lindsey) and 3,472,724 (Casey) as well as with conventional die-cutting machines.

DETAILED DESCRIPTION OF THE INVENTION

The invention will be further described with reference to the accompanying drawings wherein like numbers refer to like parts in the several views, and wherein.

Figure 1:
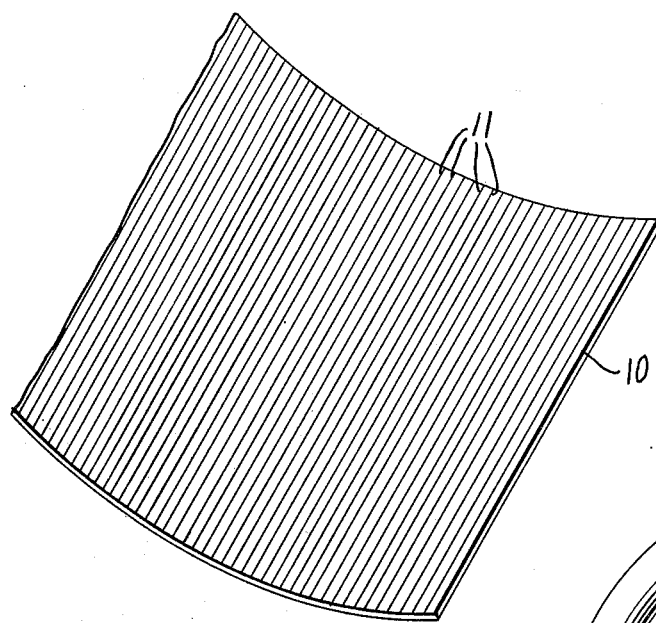
FIG. 1 is an isometric view of a segment of a transversely curled tape in accordance with the present invention.

Thus, in FIG. 1 there is shown a segment of transversely curled tape 10 exhibiting lines of deformation 11 uniformly spaced and located in regions of the tape 10 where the backing of the tape has been deformed to impart a curl to the tape.

Figure 2:
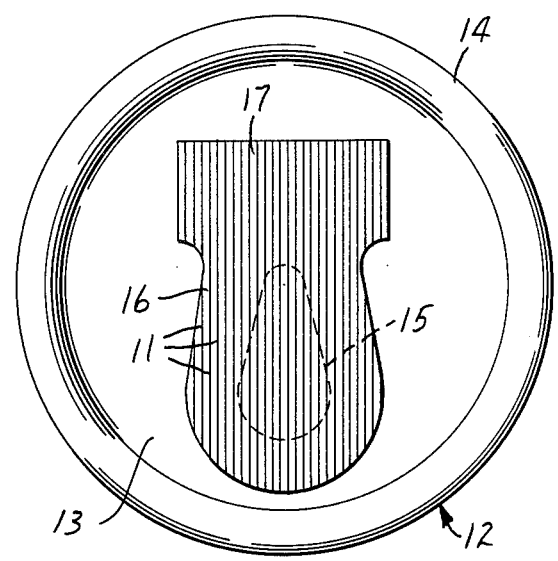
FIG. 2 is a top view of an embodiment of a container end having a preformed opening with the tape of FIG. 1 circumjacent the preformed opening.

In FIG. 2 there is shown one embodiment of a container end 12 comprising a generally flat, circular lid 13, rim 14 and preformed opening 15 (illustrated in phantom). Tab 16, exhibiting lines of deformation 11, is shown in one embodiment and is circumjacent preformed opening 15. A preferred tab 16 includes a strip of film (not illustrated) situated at the grip portion 17 of tab 16 in order to prevent that portion of tab 16 from adhering to container end 12. Additionally, the grip portion 17 of tab 16 may be embossed (not illustrated) in a manner which facilitates gripping of the tab 16.

Figure 3:
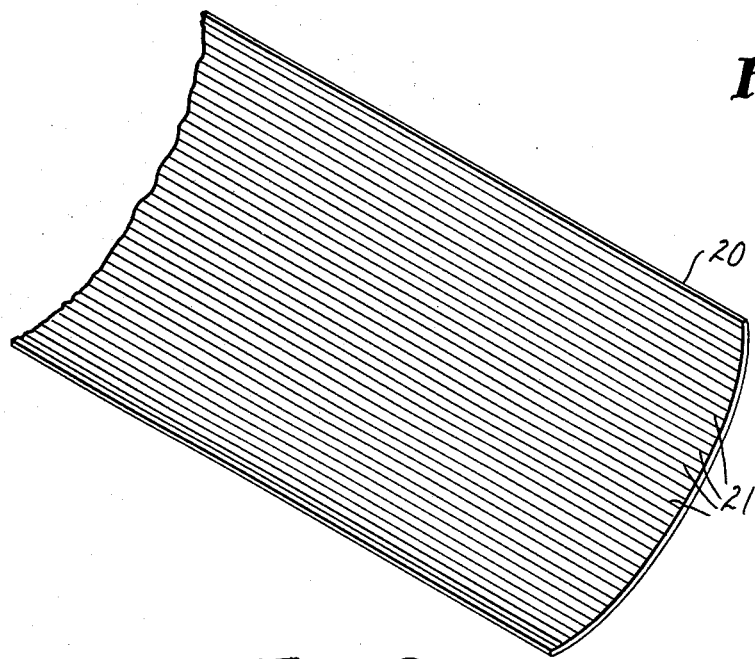
FIG. 3 is an isometric view of a segment of longitudinally curled tape in accordance with the present invention.

In FIG. 3 there is shown a segment of longitudinally curled tape 20 exhibiting lines of deformation 21 uniformly spaced and located in regions of the tape 20 where the backing of the tape has been deformed to impart a curl to the tape.

Figure 4:
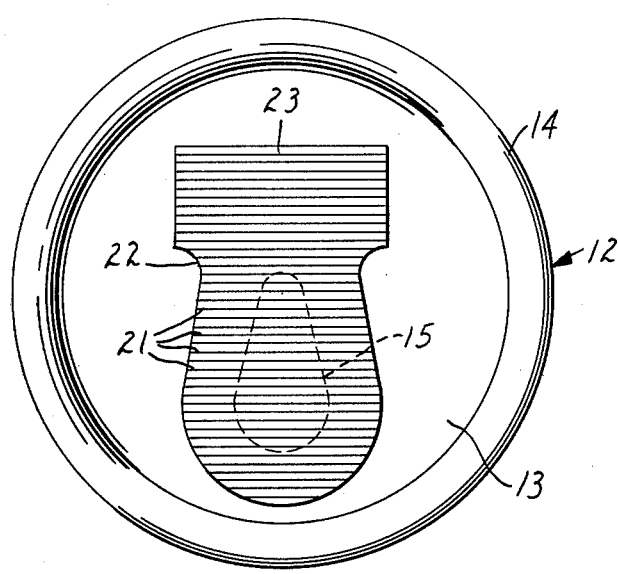
FIG. 4 is a top view of an embodiment of a container end having a preformed opening with the tape of FIG. 3 circumjacent the preformed opening.

In FIG. 4 there is shown the embodiment of the container end illustrated in FIG. 2. Tab 22, exhibiting lines of deformation 21, is shown in one embodiment and is situated circumjacent preformed opening 15. Grip portion 23 may also include the strip of film and may be embossed as is discussed in connection with the tab illustrated in FIG. 2.

Figure 5:
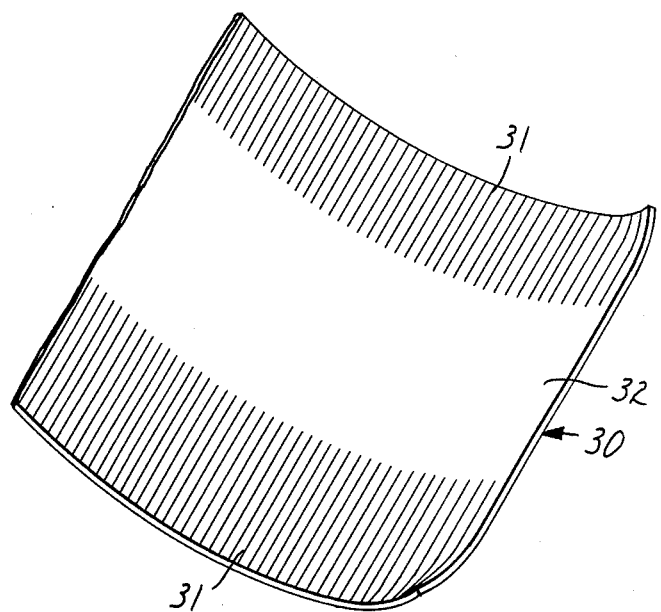
FIG. 5 is an isometric view of a segment of another transversely curled tape in accordance with the present invention.

In FIG. 5 there is shown a segment of partially transversly curled tape 30 exhibiting lines of deformation 31 uniformly spaced and located in regions of the tape 30 where the backing of the tape has been deformed to impart a curl to the tape. Curled tape 30 also comprises an area 32 extending along its length where the backing of the tape has not been deformed.

Figure 6:
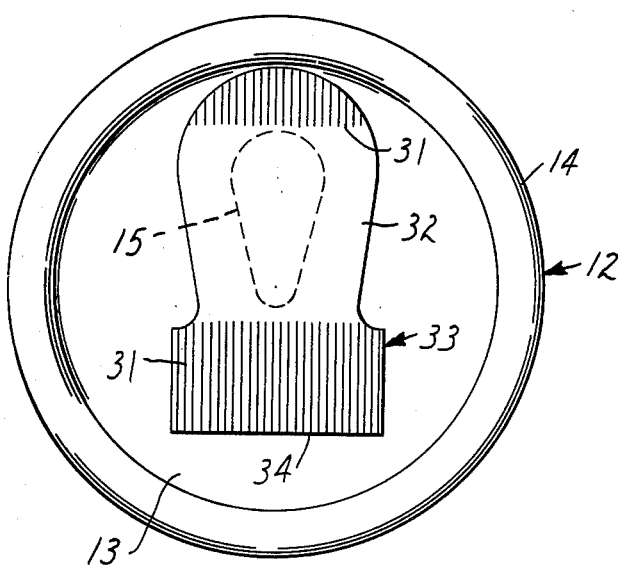
FIG. 6 is a top view of an embodiment of a container end having a preformed opening with the tape of FIG. 5 circumjacent the preformed opening.

In FIG. 6 there is shown the embodiment of the container end illustrated in FIG. 2. Tab 33, which exhibits lines of deformation 31 and area 32 where the backing has not been deformed, is shown in one embodiment and is situated circumjacent preformed opening 15 in a manner such that the lines of deformation 31 do not extend into the area of the preformed opening 15. Grip portion 34 may also include the strip of film and may be embossed as is discussed in connection with the tab illustrated in FIG. 2.

Curled tapes of the present invention can be conveniently produced through employment of the curling devices described in said copending application Ser. No. 188,672, incorporated herein by reference. One such device comprises a roller to which linerless tape is adhesively secured by means of the adhesive layer of the tape itself. The tape is then caused to detach from that roller and is bent back upon itself at an angle sufficient to deform the backing of the tape and to thereby impart a transverse curl to the tape.

A suitable roller to which the tape is initially secured is a fluted roller having evenly spaced surface elevations extending completely across the peripheral surface of the roller parallel to the axis of rotation of the roller. Employment of such a fluted roller will result in areas of uniformily spaced localized deformation of the tape backing extending across the width of the tape (e.g., such as illustrated in FIG. 1), the deformation being caused as the tape is pulled from the elevated areas of the fluted roller at an angle. The force required to remove the tape from the elevated roller surfaces, when that force is applied at an angle, over-stresses the backing in areas where the adhesive is attached to the roller and produces a series of deformations in the tape backing.

Another suitable fluted roller to which the tape is initially secured has evenly spaced surface elevations which are oriented on the peripheral surface of the roller parallel to the axis of rotation of the roller, but which do not, in contrast to the above-mentioned roller, extend completely across the peripheral surface (i.e., there is a groove in the peripheral surface of the roller, the surface of that groove being below the level of the evenly spaced surface elevations). Employment of such a fluted roller will similarly result in areas of uniformly spaced localized deformation of the tape backing. However, when such a fluted roller is employed, those lines of deformation are discontinuous in that they do not extend completely across the width of the tape (e.g., see FIG. 5).

Other types of rollers which may be employed include smooth-surfaced rollers or rollers having surfaces with various types of elevations in various patterns (e.g., herring bone, diagonal and curved elevations and discontinuous elevations other than the discontinuous pattern which results in the tape of FIG. 5).

Fluted rollers for use in the above-mentioned devices may have any number of surface elevations on their peripheral surfaces. However, if a tape having a uniform continuous curl is desired, preferred fluted rollers will have a plurality of surface elevations such that a plurality of deformations of the tape backing will result over a given length of the tape. At the same time, if a uniform curl is desired in a tape, those surface elevations preferably should not be so numerous that the fluted roller is in effect functioning as a smooth-surfaced roller, which is less apt to provide for a uniform curl.

Additionally, it should be noted at this point that the degree of curl imparted to a tape depends in part upon the spacing of the deformations of the tape backing. The more numerous those deformations, and the smaller the distance between them, the greater is the degree of curl which will result in a tape.

In order to provide for sufficient stressing of the tape backing, it is preferred that the fluted roller be heated in order to promote suitable adhesion of the tape to the roller. Adhesion of the tape to the fluted roller can be further promoted by employing a roller having a diameter large enough to insure a prolonged period of contact of the tape with the heated fluted roller. Finally, adhesion of the tape to the roller can be further promoted by means of a press roller which presses the tape firmly onto the heated fluted roller.

It is important that the angle at which the tape detaches from the surface of the fluted roller remain essentially constant. Changes in the angle of detachment will, in effect, result in a variation in the degree of curl imparted to a given tape.

One means for maintaining essentially constant the angle of detachment of a tape from the fluted roller is described in said copending application Ser. No. 188,672. It comprises a transmission connecting the fluted roller with a second roller, which is also preferably fluted and which is driven by the tape after it has passed an intermediate idler roller. A preferred transmission provides for two different drive ratios between the fluted and second rollers, with an electric clutch allowing for change between the two.

A sensor is provided which detects changes in the point of detachment of the tape from the fluted roller and acts to vary the transmission connecting the fluted and second rollers by means of engaging or disengaging the electric clutch. A preferred sensor comprises a roller which rides in a slot in the peripheral surface of the fluted roller and which is situated in the area adjacent to and behind the point at which the tape detaches from the fluted roller. Changes in the position of the roller comprising the sensor are reflected along the arm to which the roller is attached and ultimately result in turning a limit switch on or off. As the limit switch is turned on or off, the electric clutch is engaged or disengaged, respectively.

Thus, when the tape is detaching from the fluted roller prematurely, the sensor functions to change the drive ratio between the fluted and second rollers so as to result in a greater speed of rotation of the fluted roller with respect to the second roller. In this manner, the point of detachment of the tape from the fluted roller is gradually delayed. The drive ratio will remain at that new value until the sensor later detects that the tape is then detaching beyond the point desired, at which time the drive ratio will return to its original value.

Regarding the degree of curl imparted to a tape, the greater the degree the tape is bent back upon itself (that is the smaller the angle formed by the tape at the apex or bend) the greater the degree of curl which is imparted to the tape since the tape backing will be stressed to a greater extent. The degree of curl desired in a particular tape will, of course, depend upon the end-use contemplated for that tape.

While the aforementioned slot may result in the formation of localized areas of deformation which are discontinuous, this is not reflected in the drawings.

An alternative curling device in accordance with said copending application Ser. No. 188,672 comprises means wherein a tape backing is deformed into grooves of a fluted roller. If the grooves of the roller are perpendicular to the axis of rotation of that roller then a tape exhibiting longitudinal curl will result. A resilient rubber roller or a second fluted roller capable of meshing engagement with the first fluted roller may be used as a means whereby the tape is deformed into the grooves of the first fluted roller.

Curled tapes of the present invention can comprise the various materials which are well known in the art for tape backings, adhesives, primers and the like. Particularly suitable materials for tapes which are to be used as container closures have been described in U.S. Pat. Nos. 3,389,827 (Abere et al.) and 3,990,603 (Brochman), incorporated herein by reference, and are discussed below.

The backing preferably will be up to about 20 mils (500 micrometers) and most preferably about 1 to 10 mils (25 to 250 micrometers) in thickness and it should be capable of being pulled back upon itself without rupture. As a practical matter the backing should have a uniform thickness across its width and along its length. For convenience of removal of the adhesive strip from a container end, the backing should neither break nor elongate more than 25% under a tension of 4 pounds (1.8 kg). To provide a closure which will withstand the forces exerted on it with an adequate margin of safety, the backing material at a width of one inch (2.54 cm) should have a strength at break of at least 15 pounds (6.8 kg).

Representative materials which have been found suitable as backing members include tough plastic films which have been oriented and heat-set in manners which are well known in the art in order to impart requisite properties of toughness and heat-resistance. Suitable films include polyethylene, polypropylene, polyethylene terephthalate, polytetramethylene terephthalate, polycarbonate, 6-6 nylon (e.g., that available under the trade designation "Zytel ST 801 HS" from E.I. duPont de Nemours Co.), physical blends of polytetramethylene terephthalate/polyethylene, physical blends of polytetramethylene terephthalate/polyethylene terephthalate, physical blends of polytetramethylene terephthalate/phenoxy, glycol modified polyethylene terephthalate, unplasticized polyvinylchloride, polyethylene terephthalate/polyethylene composites and films derived from a graft copolymer comprising acrylonitrile/methylmethacrylate copolymer grafted onto an acrylonitrile/butadiene copolymer backbone (e.g. that available under the trade designation "Barex" from Vistron Corporation). A particularly suitable film is is a 2-mil film of polyethylene terephthalate (available under the trade designation "Scotchpar 2120" from 3M). Other representative materials include thin metal foils such as thin metal foils (e.g., aluminum, steel, etc.), as well as metal foil composites.

Tapes useful as closures have a pressure-sensitive adhesive which will withstand a dead shear load of 8.8 psi (60.7 kPa) at 140° F. (60° C.) for at least 1000 minutes. This shear strength test is described in U.S. Pat. No. 3,389,827 (Abere et al.).

Suitable pressure-sensitive adhesives include as the main component elastomeric block copolymers prepared from conjugated dienes such as isoprenes, butadiene, copolymers of styrene and butadiene, as well as their homologues.

Examples of suitable tackifying resins for elastomers described herein includae rosin, polyterpene resins, coumarone-indene resins, phenol-aldehyde resins, hydrogenated rosin, and pentaerythritol or glycerol esters thereof.

One particularly suitable adhesive comprises styrene/butadiene (30/70) (available under the trade designation "Kraton" from Shell Chemical Company) blended with alpha-pinene resin (available under the trade designation "Piccolyte" from Hercules).

Employment of a primer, while optional, is desirable in order to assure secure bonding of the adhesive layer to the tape backing. Useful primers are described in U.S. Pat. No. 3,990,603 (Brochman), incorporated herein by reference, and include polycarbodiimide polymers, a polyurethane (comprising the reaction product of 11.4 parts polyester diol, eq. wt. 8,000 and 1.1 parts polymethylenepolyphenylisocyanate, eq. wt. 132), and phenoxy resin (comprising thermoplastic condensation product of bisphenol A and epichlorohydrin, molecular weight about 30,000, with no terminal epoxy groups, commercially available from Union Carbide under the trade designation "Phenoxy PKHH"). A particularly suitable primer is the linear saturated soluble polyester which is available under the trade designation "Vitel PE 222" from B. F. Goodrich Co.

Curled tapes of the present invention can be rendered opaque by means of pigmentation of the tape backing as the backing is extruded or, alternatively, by means of vapor coating the tape backing with a thin layer of metal (e.g., aluminum, silver, copper, etc.). In the case of a vapor coat, it is of often desirable to apply a top coat over the vapor coat in order that the latter be protected from any abrasion which can cause an undesirable appearance of the tape. One particularly useful material for a topcoat is "Vitel PE 222," discussed above as also being a suitable primer.

As is indicated in U.S. Pat. No. 3,990,603 (Brochman), a vapor coating may also function to improve the impermeability (e.g., to air and moisture) of the film backing. It has been found in the present invention that deformation of a vapor-coated tape backing may lessen the impermeability of a vapor-coated tape, perhaps by fracturing the vapor coating along the lines of deformation. Thus it may be desirable, when impermeability of a vaporcoated tape is desired, to employ curled tapes such as that illustrated in FIG. 5 in order that an opening in a container end may be sealed without having lines of deformation extend into the area of the opening (e.g., see FIG. 6).

It is often desirable that linerless tapes be coated with a silicone backsize in order to facilitate the unwinding of rolls of the tape and to protect any topcoat or vapor coat from possible damage as the rolls are unwound. One particularly suitable silicone backsize is "Silicone SYL-OFF 23" (available from Dow Corning).

When transversely curled tapes of the present invention are to be applied to container ends, it is preferred that the tape applying machines, such as those described in U.S. Pat. Nos. 2,990,081 (deNeui) 3,750,511 (Toensing), and said copending application Ser. No. 41,629, incorporated herein by reference, be equipped with vacuum wheels of the type disclosed in said copending application Ser. No. 121,715, incorporated herein by reference. These vacuum wheels adhesively secure only a portion of a given tape segment to a container end and the remaining portion remains unadhered as the result of the tape's curl. After a curled tape segment has been applied to a container end by means of such a vacuum wheel, the remaining unsecured portions of the curled tape segment can then be flattened onto the container end in a manner which assures exclusion of air between the tape segment and the container end using the flattening devices discussed in the aforementioned copending application. When a tab of transversely curled tape such as illustrated in FIG. 1 is applied to a container end by means of the above type of machines, the lines of deformation of the tab will be oriented as is illustrated in FIG. 2. When a tab of transversely curled tape such as illustrated in FIG. 5 is applied to a container end by means of the above type of machines, the lines of deformation of the tab will be oriented as is illustrated in FIG. 6.

It has been found that tapes having curls of from about one-half inch to about two inches (1.3 to 5.18 cm) in radius are most suitable for use with the preferred vacuum wheels and flattening devices described in said copending application Ser. No. 121,715. Tape segments exhibiting curl of greater than about two inches (5.1 cm) in radius may have a tendency to instantaneously flatten out onto the container end and entrap air when applied by means of a vacuum wheel. On the other hand, tape segments exhibiting curl of a radius of less than about one-half inch (1.3 cm) may render flattening of tape segments onto container ends difficult, if not virtually impossible. Furthermore, tapes exhibiting a curl of less than about one-half inch may have a tendency to snag in any recesses on the peripheral surfaces of the vacuum wheel and may be thrown clear of that surface as a result.

Curled tape exhibiting longitudinal curl may be conveniently applied to surfaces using tape applying machines of the type described in U.S. Pat. Nos. 2,684,240 (Lindsey) and 3,472,724 (Casey), incorporated herein by reference, provided that those machines have been modified so as to include means (e.g. a vee-shaped applying pad) whereby only a selected portion of a curled tape segment is adhered initially to the surface. Furthermore, means (e.g. a flattening device comprising a resilient vee-shaped pad which deforms as contact is made with the surface) should be provided which will permit the curled tape segment to then be completely flattened onto the surface with exclusion of air between the tape and the surface. The projecting wheel and tape crease wheel described in U.S. Pat. Nos. 2,684,240 (Lindsey) and 3,472,724 (Casey), respectively, preferably will have rounded grooves when used with the longitudinally curled tapes described herein. When a tab of longitudinally curled tape such as illustrated in FIG. 3 is applied to a container end by means of the above type of machines, the lines of deformation of the tab will be oriented as is illustrated in FIG. 4.

Either transversely or longitudinally curled tapes can also be applied using conventional die-cutting machines which are well-known in the art provided that those machines are modified in a manner analogous to that described in the preceeding paragraph (e.g. modified with respect to applying pads and flattening devices).

Curled tape produced using the curling devices described herein can be rewound for later employment in tape applying machines. When curled tape is to be stored for later use it is preferred that the tape be convolutely rewound in rolls such that the adhesive layer of the tape is on the outside of roll. By winding curled tape in this manner, the tape will retain its curl for a longer period of time and this is particularly important when the tape is stored at elevated temperatures at which the tape normally will have an increased tendency to lose its curl with time.

Alternatively, the curling devices described herein can be conveniently mounted onto tape applying machines such that curled tapes will be applied to container ends without the intermediate step of having to rewind the tape prior to use.

Other variants are permissible within the scope of the present invention.

What is claimed is:

1. A tape comprising a backing and a pressure-sensitive adhesive layer wherein said backing of said tape is deformed in uniformly spaced, localized areas to impart at least a temporary curl to said tape.

2. A tape in accordance with claim 1 wherein said backing of said tape is deformed in uniformly spaced, localized areas.

3. A tape in accordance with claim 1 wherein said tape exhibits transverse curl.

4. A tape in accordance with claim 1 wherein said tape exhibits longitudinal curl.

5. A tape in accordance with claim 1 wherein said localized areas of deformation are discontinuous.

6. A tape in accordance with claim 1 wherein said backing is selected from the group consisting of metals and plastics.

7. A tape in accordance with claim 1 wherein said backing of said tape is selected from the group consisting of polyethylene, polypropylene, polyethylene terephthalate, polytetramethylene terephthalate, polycarbonate, 6-6 nylon, physical blends of polytetramethylene terephthalate/polyethylene, physical blends of polytetramethylene terephthalate/polyethylene terephthalate, physical blends of polytetramethylene terephthalate/phenoxy, glycol modified polyethylene terephthalate, unplasticized polyvinylchloride, polyethylene terephthalate/polyethylene composites, and graft copolymers comprising acrylonitrile/methylmethacrylate copolymer grafted onto acrylonitrile/butadiene copolymer backbone.

8. A tape in accordance with claim 1 wherein said backing comprises polyethylene terephthalate and said adhesive layer comprises styrene/butadiene copolymer blended with an alpha-pinene resin.

9. A tape in accordance with claim 8 wherein said backing is from about 1 to 10 mils in thickness.

10. A tape in accordance with claim 1, wherein the surface of said backing opposite said adhesive is coated with a silicone backsize.

11. An article of manufacture comprising a container end having at least one preformed opening, said preformed opening sealed with the tape of claim 1.

12. A convolutely wound roll of the tape of claim 1, wherein said adhesive layer is exposed on the outside of said roll.

* * * * *